United States Patent
Hägnander et al.

(10) Patent No.: US 9,457,815 B2
(45) Date of Patent: Oct. 4, 2016

(54) MULTI-LEVEL VEHICLE INTEGRITY AND QUALITY CONTROL MECHANISM

(71) Applicant: e-AAM Driveline Systems AB, Trollhättan (SE)

(72) Inventors: Johan O. Hägnander, Trollhättan (SE); Sven E. Johansson, Uddevalla (SE); P. Stefan Elgåfoss, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days.

(21) Appl. No.: 14/382,911

(22) PCT Filed: Mar. 12, 2013

(86) PCT No.: PCT/IB2013/000367
§ 371 (c)(1),
(2) Date: Sep. 4, 2014

(87) PCT Pub. No.: WO2013/136156
PCT Pub. Date: Sep. 19, 2013

(65) Prior Publication Data
US 2015/0025748 A1    Jan. 22, 2015

Related U.S. Application Data

(60) Provisional application No. 61/610,639, filed on Mar. 14, 2012.

(51) Int. Cl.
*B60W 50/02* (2012.01)
*B60K 28/06* (2006.01)
*B60W 50/00* (2006.01)

(52) U.S. Cl.
CPC .............. *B60W 50/02* (2013.01); *B60K 28/06* (2013.01); *B60W 2050/0006* (2013.01)

(58) Field of Classification Search
CPC .................... B60W 50/02; B60W 2050/0006; B60K 28/06
USPC ......................................................... 701/45
See application file for complete search history.

(56) References Cited

U.S. PATENT DOCUMENTS

2006/0111825 A1* 5/2006 Okada ............... B60W 50/0205
701/48

* cited by examiner

*Primary Examiner* — Brian P Sweeney
(74) *Attorney, Agent, or Firm* — Harness, Dickey & Pierce, P.L.C.

(57) ABSTRACT

The processor-implemented control system for automotive vehicles assigns master control functionality separately to each controlled direction of motion. Within each master control, a multi-layered control architecture is implemented. At control level 0 multiple localized actuators associated with the controlled motion direction are monitored to ensure integrity but are otherwise allowed to operate on their own. At control level 1 the master control plays a supervisory role, coordinating behavior of the multiple actuators. At levels 2 and 3 the master control assesses trustworthiness of the driver and factors that trustworthiness into the control equation.

28 Claims, 5 Drawing Sheets

MULTI-LEVEL VEHICLE INTEGRITY AND QUALITY CONTROL MECHANISM

CROSS REFERENCE TO RELATED APPLICATIONS

This application is a U.S. National Phase Application under 35 U.S.C. 371 of International Application No. PCT/IB2013/000367 filed on Mar. 12, 2013, which claims the benefit of U.S. Provisional Application Ser. No. 61/610639 filed on Mar. 14, 2012. The entire contents of the above applications are incorporated herein by reference.

FIELD

The present disclosure relates generally to vehicle control systems and more particularly to a computer or processor implemented system that implements a multi-level architecture that flexibly enhances system integrity and enables different vehicle control behaviors based on driver trustworthiness.

BACKGROUND

Vehicles today commonly employ multiple localized control systems each comprising a plurality of different sensors and actuators. These localized control systems work individually or in tandem to control vehicle behavior. For example, the vehicle propulsion system and braking system can be operated in tandem to effect sophisticated control over the vehicle handling in the face of diverse conditions. Because these localized control systems can operate independently or in combination there may be many ways to accomplish the same end result. For this reason it can often be unclear which control has overriding responsibility for vehicle behavior at any point in time.

The traditional solution to such ambiguity, which has evolved over time, is simply to use a collection of design rules for automotive engineers to follow. For example, in the case of vehicle yaw control, both the steering system and the braking system can affect yaw and yaw change in a vehicle. Thus a standard has evolved that places the braking system in the primary role of yaw master, with the steering system taking a subservient role.

There is nothing inherently wrong with employing standards that place one control system in a superior role with respect to other systems that are also responsible for the controlled vehicle behavior. However, vehicles are becoming more complicated and the fixed rules of the past may no longer be optimal or appropriate. For example, hybrid vehicles have recently become popular. In such vehicles there are multiple sources of propulsion: the wheels may be driven by both internal combustion engine and electric motor. In some cases, each wheel may be independently driven by its own dedicated motor. Thus the torque delivered to the vehicle at any given point in time can be a complex blend produced by both internal combustion engine and electric motor or motors. The rigid standards of the past are often ill-equipped to handle these situations.

To make matters even more challenging, the ambiguity as to which system is in control can change dynamically. Depending on driving conditions, the optimal allocation of control may switch from one propulsion system to another. Thus, it may not be appropriate to simply establish by design rule that one system should always takes precedence over the other, because the reasons for selecting one system over the other may change under different driving conditions. Thus, a preferred solution would be to have flexible control to allow intelligent decisions to be made with respect to the control hierarchy, based on actual vehicle operating conditions.

SUMMARY

The present disclosure provides a computer-implemented or processor-implemented control system and control method that addresses the above issues using a control architecture that assigns master controller roles to each of the controlled motion degrees of freedom (e.g., propulsion, yaw, etc.) and does so in a multi-level control strategy designed to fulfill integrity level requirements (e.g., Automotive Safety Integrity Level—ASIL) while handling a broad range of vehicle operating and driver trustworthiness conditions not heretofore possible. These master controller roles are administered by a computer-implemented or processor-implemented multi-level control system that operates in a supervisory role to dynamically allocate control functions to the local control systems associated with the motion degree of freedom which it controls. The master controller takes into account vehicle operating conditions, external driving conditions, such as weather and road conditions, and also driver's trustworthiness conditions to effect dynamic control.

Regarding driver trustworthiness, there are a number of human physiological reasons why the driver may not be functioning at optimal acuity. The driver may be distracted or drowsy, intoxicated or medically ill, performing illogical operations or otherwise incapacitated. The disclosed multi-level control system handles all of these cases.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
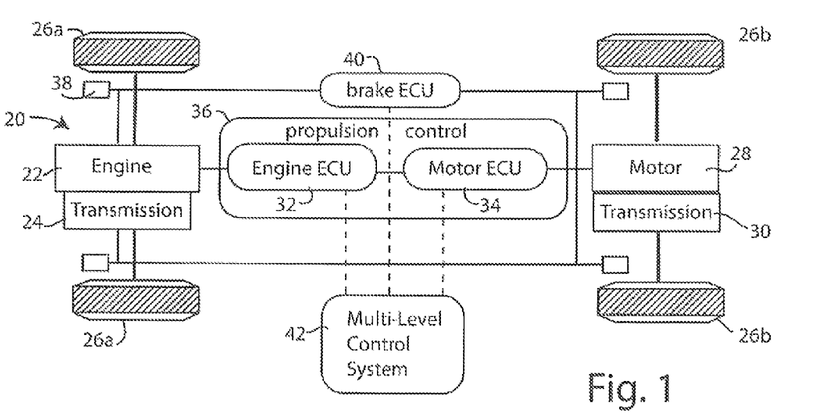
FIG. 1 shows an exemplary vehicle having both an internal combustion engine and an electric motor arranged in an exemplary hybrid vehicle configuration.

Referring to FIG. 1, the exemplary vehicle 20 includes an internal combustion engine 22 coupled through transmission 24 to the wheels 26a and an electric motor 28 coupled through transmission 30 to the wheels 26b. The vehicle is equipped with separate engine control units (ECU) for controlling the engine 22 and motor 28, respectively. These are shown at 32 and 34. Collectively, the engine ECU 32 and motor ECU 34 comprise the propulsion control system 36. If desired the vehicle may include a motor cluster, the term cluster being defined as one or more torque providers, where the torque provider can be but is not limited to a combustion engine or an e-motor. Thus the vehicle may employ, for example, a combustion engine cluster comprising multiple combustion engines, or an e-motor cluster comprising multiple e-motors, or a combination cluster, comprising one or more clusters of combustion engines and/or e-motors.

The vehicle further includes a braking system that includes a brake 38 for each wheel, and a brake ECU 40 that sends electric control signals to the brake 38, causing them to selectively operate individual brakes or sets of brakes when the driver applies the brake pedal and also automatically under certain vehicle motion control conditions.

In accordance with the present disclosure, the propulsion control system 36 (engine ECU 32 and motor ECU 34) and the brake ECU are themselves controlled by a multi-level control system 42, the details of which will now be described.

The preferred multi-level control system 42 is computer-implemented or processor-implemented by executing program instructions (software) on a suitable processor, such as a microcontroller. In mass production, the multi-level control system may also be implemented using application specific integrated circuits (ASICs) if desired. Moreover, while a dedicated microcontroller 50 has been illustrated in the embodiments described here, it will be understood that the functionality provided by microcontroller 50 could be implemented using an existing processor within the vehicle.

Figure 2:
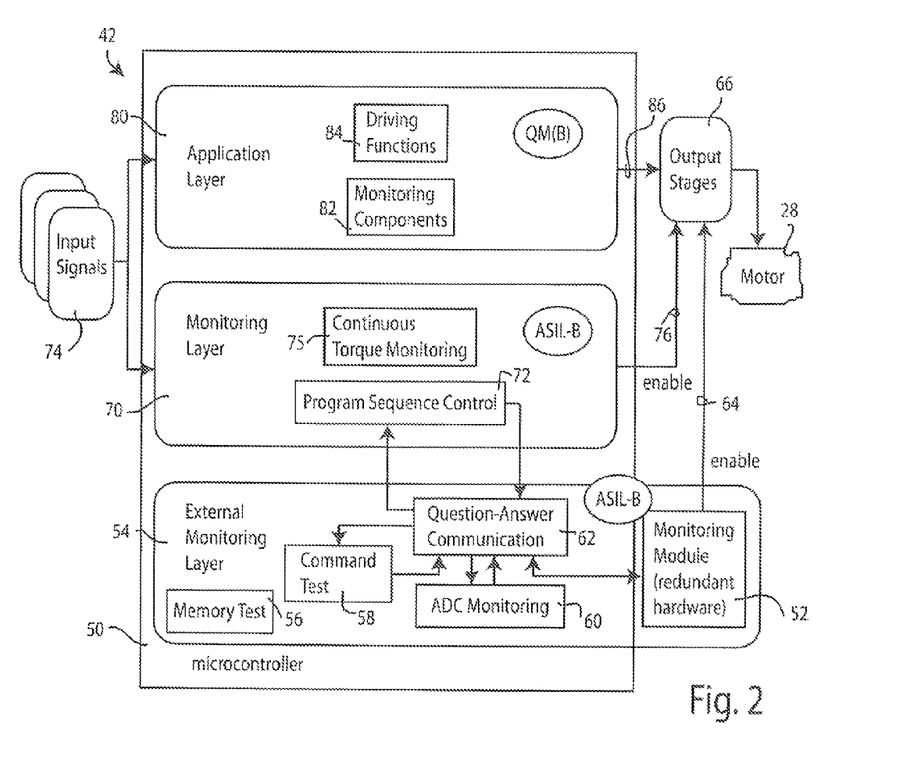
FIG. 2 is a functional block diagram illustrating the multi-tiered concept in three layers, an external monitoring layer, a monitoring layer and an application layer.

FIG. 2 illustrates that the software architecture of the preferred multi-level control system at 42 comprises three software layers. In this disclosure the terms "layers" and "level" are not interchangeable. Unless otherwise apparent from the context, the term "layer" refers to software architecture, that is, how the computer or processor instructions are organized architecturally. The term "level" refers to control architecture, that is, how the disclosed control system handles different vehicular control scenarios according to different control schemes having different degrees or levels of control.

In FIG. 2 the three software layers are implemented primarily on a microcontroller, shown diagrammatically at 50. If desired, some of the lower layer monitoring functions can be implemented using the redundant hardware, such as a monitoring module in the form of a separate microcontroller illustrated diagrammatically at 52.

The lowermost layer of the software architecture is the external monitoring layer 54. To this layer is assigned the microcontroller memory test functions 56 and additional command test functions 58 which perform internal testing to monitor the health of the processes running on microcontroller 50. The external monitoring layer 54 also implements the core sensor monitoring functions, referred to as the ADC monitoring functions 60.

In essence, the plural sensors located throughout the vehicle communicate information over the communication bus of the vehicle and the signals are fed to the multi-level control system 42 where they are selectively monitored by the ADC monitoring functions 60 of the microcontroller 50. The communication bus data are also fed as input signals 74 to the higher software layers, which will be discussed below. Examples of a suitable communication bus include the CAN bus (Controller Area Network bus, also known as CANbus), as well as communication and networking technologies such as FlexRay, LIN, MOST, Ethernet and other networking and communication technologies.

As part of its monitoring function, the external monitoring layer 54 includes a question-answer communication module 62 comprising a stored set of commands that periodically issue questions (requests for information) to the ADC monitoring functions 60 and then receive and process the replies. One purpose of the question-answer communication module 62 is to ensure that communication between the multi-level control system 42 and the vehicles sensors and actuators remain reliable. If the ADC monitoring functions 60 are unable to give a proper response to interrogation by the question-answer communication module 62, the integrity of the system becomes suspect whereupon corrective action or shutdown may be ordered.

Question-answer communication module 62 is also linked with the command test functions 58 (as illustrated) so that the command test functions 58 may be periodically run to test the health of the question-answer communication module 62.

The question-answer communication module 62 is also in communication with the monitoring module 52, which preferably runs on redundant hardware such as a separate microcontroller or microprocessor. The monitoring module functions as a watchdog circuit that periodically sends a health check message to the question-answer communication module 62. If the module 62 does not reply to that message, the monitoring module 52 concludes that an error has occurred in microcontroller 50, whereupon the monitoring module 52 withdraws the enable signal on line 64, disabling the output stages 66 and thereby allowing the controlled systems (e.g., engine ECU 32, motor ECU 34, etc.) to operate autonomously and without reliance on signals from the multi-level control system 42.

The middle layer of multi-level control system 42 is the monitoring layer 70. The monitoring layer 70 includes a program sequence control module 72 that operates a basic control loop whereby a series of system monitoring functions are continuously performed. To ensure health of the monitoring layer 70, the program sequence control module 72 communicates with the question-answer communication module 62. If module 72 does not properly respond to interrogation by the question-answer communication module 62, the enable signal on 64 is withdrawn as discussed above.

A core function of monitoring layer 70 is the continuous torque monitoring function 75. This torque monitoring function compares actual propulsion torque, as determined by input signals 74 acquired from the communication bus with requested propulsion torque (calculated by the application layer 80) to determine if a large deviation is detected. A large deviation between actual propulsion torque and requested propulsion torque could signify that the multi-level control system 42 is not functioning properly. In such case the monitoring layer 70 withdraws its enable signal on line 76 to disable the output stages 66 and allow the controlled systems (e.g., engine ECU 32, motor ECU 34, etc.) to operate autonomously and without reliance on signals from the multi-level control system 42.

The top layer of the multi-level control system is the application layer 80. This layer receives input signals 74, preferably via the vehicle communication bus. It provides two core functions, namely: components monitoring functions 82 and the driving functions 84. The application layer 80 provides control signals to the output stages 66 on line 86. Utilizing the components monitoring functions 82, the application layer interprets the input signals 74 as well as calculated driving functions 84 to generate the control signals that are sent to the output stages and ultimately to control the actuators associated with the controlled system or systems. If the monitored components indicate that the vehicle is currently fishtailing, for example, control signals are automatically generated and sent to the appropriate output stages to cause the controlled systems to compensate automatically.

The architecture illustrated in FIG. 2 distributes functionality among the external monitoring layer 54, the monitoring layer 70 and the application layer 80 to achieve a secure and integrity-protected system. The monitoring layer 70 secures the output from application layer 80. Thus, if the application layer 80 calculates a requested propulsion torque, the monitoring layer 70 checks the requested propulsion torque against the actual propulsion torque to detect if there is a large deviation that might not be appropriate. In such case, the monitoring layer 70 disables the output stages 66 by withdrawing its enable signal on line 76.

In a like fashion, the external monitoring layer 54 secures the performance of the two layers above it and will disable the output stages 66 by withdrawing its enable signal on line 64 if processing errors within microcontroller 50 or other system function errors are detected.

In the preferred embodiment, this tired, multiple layer architecture is designed to support and conform with Automotive Safety Integrity Level (ASIL) standards, as set forth in ISO 26262. In the illustrated embodiment, the application layer is designed to conform to QM(B) integrity standards of the ASIL (ISO 26262) standards. The remaining two layers are designed to meet ASIL(B) standards.

Figure 3:
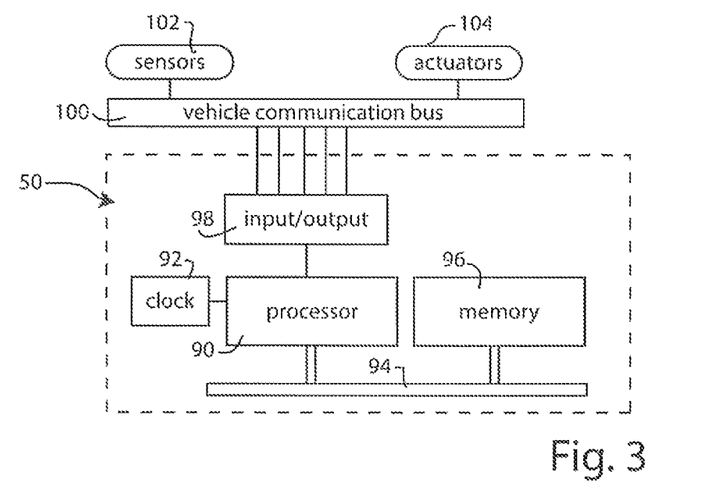
FIG. 3 is an electronic circuit diagram depicting the microcontroller useful in implementing the multi-tiered control system.

Referring now to FIG. 3, the electronic circuit details of microcontroller 50 are shown. It should be understood that FIG. 3 is intended to show merely the basic components of microcontroller 50. In a particular embodiment, the microcontroller may have a different configuration. Microcontroller 50 includes a processor or microprocessor 90 which has an associated system clock 92. The processor is coupled via an internal bus structure 94 to the system memory 96. Memory 96 may be implemented to include both non-volatile memory to store program instructions upon which processor 90 operates to implement the functionality described herein, and also random access memory (RAM) used by processor 90 to store input and output data as well as the results of intermediate calculations.

Figure 4:
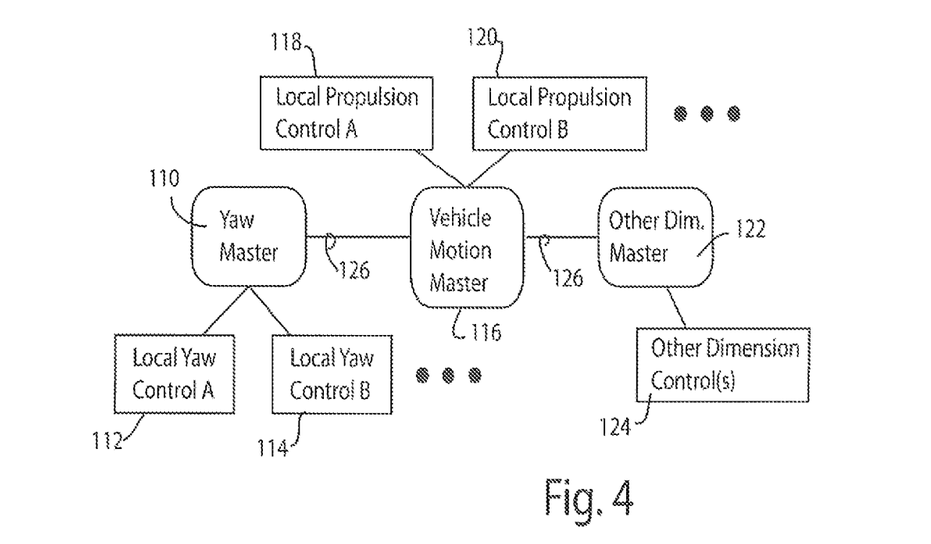
FIG. 4 is a high level control system architecture diagram, depicting how the executable instructions for operating the microcontroller may be organized into separate master control structures for each controlled dimension.

Processor 90 is coupled to an input/output circuit 98 that communicates with the vehicle communication bus 100. The communication bus receives signals from sensors 102 disposed throughout the vehicle and issues control signals to actuators 104 associated with the controlled functions. Thus, when comparing FIG. 3 with FIG. 2, the input signals 74 (FIG. 2) are received from sensors 102 (FIG. 3) while the output stages 66 (FIG. 2) ultimately control actuators 104 (FIG. 4). Included among the sensors 102 may be an optional external input to allow the multi-level control system to voluntarily enter a control level whereby control of the vehicle is at least partially controlled by an external information or guiding source.

The multi-level control system 42 of the presently preferred embodiment allocates control functionality separately to each controlled dimension. More specifically, the control architecture assigns a Master for each controlled dimension. Each master asserts control over the individual control systems for that dimension that are distributed throughout the vehicle. Thus, as illustrated in FIG. 4, the yaw master 110 asserts control over local yaw-control-A 112 and local yaw-control-B 114. By way of example, local yaw-control-A might be the vehicle braking system; local yaw-control-B might be the electric motor system, and so forth. While two local yaw control system have been illustrated, it will be understood that the yaw master 110 can assert control over any number of local control systems that are capable of affecting motion changes in the yaw dimension.

In a similar fashion, vehicle motion master 116 asserts control over local propulsion controls 118, 120, and any other local propulsion controls on the vehicle. While propulsion and yaw are currently the two most popular dimensions for the vehicular control, the principles of the invention can be extended to other dimensions (such as the roll dimension and the pitch dimension). Thus, for illustration purposes, FIG. 4 includes "other" dimension master 122 that asserts control over other dimension controls 124.

The individual masters primarily function independent of one another to assert control over their associated local controls. However, if desired, the system can integrate functionality across dimensions. Thus, in FIG. 4, the yaw master 110, vehicle motion master 116 and other dimension master 122 are interlinked as illustrated diagrammatically by line 126 to allow communication between them if desired. The vehicle motion master 116 can evaluate combinations of motion attributes such as yaw and propulsion. If, for example, the vehicle has a rear axle integration of an e-motor with unintended behavior (full torque), this can lead to a deviation of several motion attributes such as yaw and longitudinal acceleration at the same time. The vehicle motion master prioritizes between attributes to effect control.

Each of the masters is implemented to effect a multi-level control architecture. For illustration purposed, the propulsion master architecture has been depicted in FIG. 5. The same multi-level architecture would be used for the other masters and has thus not been illustrated here.

Figure 5:
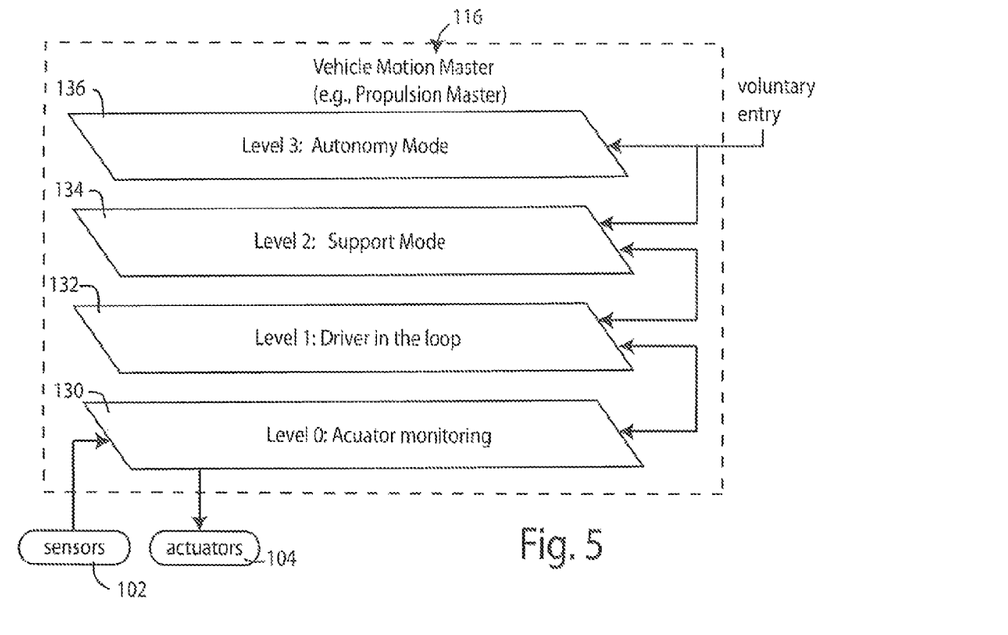
FIG. 5 is a more detailed software architecture diagram depicting how a master control structure of FIG. 4 (in this case, the propulsion master) is functionally subdivided into hierarchical levels that communicate with and control one another.

The multi-level architecture illustrated in FIG. 5 preferably employs four levels to allow different rules to be in effect, depending on the integrity of the mechanical systems and the trustworthiness of the driver. Level 0, designated as 130, corresponds to a traditional actuator monitoring function. The microcontroller 50 (not shown) monitors the health indications from the actuators 104, and also optionally sensors 102, but performs no coordination among the multiple localized control systems associated with that master. Thus, when the system is operating at level 0, the local control mechanisms operate autonomously and without guidance from the multi-level control system 42.

The next layer above is level 1, depicted at 132. When the system is operating at level 1, the microcontroller 50 monitors sensors 102 and coordinates control among the localized control systems associated with that master. When operating at level 1, the control systems assume that the driver's condition is trustworthy and thus any inputs from sensors 102 that are correlated to driver action are trusted and the corresponding input signals from sensors 102 are used without modification.

The next level above is level 2, designated at 134. When a system is operating at level 2, the driver has been determined as being untrustworthy. Techniques for detecting the untrustworthy driver condition are discussed below. A driver may be deemed untrustworthy if it is detected the driver is drowsy, intoxicated, physically ill, making illogical maneuvers, passed out, etc. These different untrustworthy conditions may correspond to different degrees of untrustworthiness. Thus the illustrated embodiment sets a Boolean yes-no untrustworthy flag and also assigns a numeric level, allowing the system to perform differently depending on the level of driver untrustworthiness. In this regard, it will be appreciated that the condition where the driver has become momentarily drowsy should be treated differently than the condition where the driver is having an epileptic seizure or has passed out.

When the system is operating in level 2, the driver has been deemed untrustworthy, but the degree of untrustworthiness is below a predetermined cautionary threshold. In such instance, the level 2 control operates in a support mode where selected inputs from sensors 102 that correlate to driver action are modified or ignored by the control algorithm. Under level 2 control, the driver's input is still used, but appropriate modifications are automatically made to compensate for the driver's inattentiveness or poor reaction time.

Level 3, shown at 136, corresponds to two cases: (1) a state where the driver is deemed untrustworthy and the degree of untrustworthiness is above a predetermined cautionary threshold, indicating that the driver's input should not be trusted at all, or (2) a state where a system has voluntarily taken control of the vehicle. When operating in level 3 the control system operates in autonomy mode that applies the same basic control algorithms as used in level 2 except that the driver's input from selected sensor signals is not used. This is not to imply that all signals associated with driver input are ignored, but simply that some signals are ignored as appropriate under the circumstances. For example, when operating in level 3, the system might ignore the driver's signal to accelerate the vehicle when it is assessed that the driver is unconscious. However, the steering angle signal might still be utilized, on the assumption that the vehicle was being steered in the correct direction before the driver passed out. Alternatively, the vehicle may be operating in level 3 because another source has voluntarily taken control of vehicle operation, such as where another vehicle is controlling the level 3 vehicle (vehicle-to-vehicle control), or where another external information or guiding source is in control. For example control may be provided by an external source disposed along the roadway.

As illustrated in FIG. 5, the master control architecture is structured to support hierarchical communication of vehicle safety and integrity control messages between levels. Thus there is bi-directional communication between level 0 and level 1, between level 1 and level 2, and between level 2 and level 3. This intercommunication supports the passing of vehicle safety and integrity control messages between levels. The different levels are assigned to monitor and effect control over vehicle safety and integrity at different levels of abstraction, level 0 focusing on the most fundamental vehicular issues and levels 1-3 focusing on successively higher vehicle-human integrity issues.

When level 0 detects an integrity issue, it reports up to level 1, and level 1 makes the decision whether to disenable a selected actuator. If communication is lost between level 0 and level 1, level 0 is configured to act on its own to make the actuator shut off decision. Level 0 and level 1 are different in that they operate on different classes of information. Level 0 makes integrity decisions based on the native physical parameters observed by monitoring the sensors.

Level 1 makes integrity decisions based on calculated parameters derived from the native data received from level 0. Thus level 1 operates on physical values at a higher level of abstraction than level 0. By way of example, level 0 might monitor whether the actual torque and the requested torque are within an acceptably close range for the internal combustion engine and separately for the electric motor. In other words, because the internal combustion engine and electric motor are separate systems, at level 0 the systems are evaluated separately to determine the respective integrities.

In contrast, level 1 is able to make integrity determinations regarding the combined operations of the internal combustion engine and electric motor. Thus at level 1 the actual torque for the total vehicle (internal combustion engine plus electric motor) is calculated and that value is compared with a calculated requested torque value to determine overall vehicle propulsion integrity.

Levels 2 and 3 operate at a higher or more complex level of abstraction than level 1. Whereas level 1 focused on the integrity of the vehicular systems, levels 2 and 3 introduce the human element into the equation. Thus levels 2 and 3 focus on integrity issues concerning the combined vehicle-human system. From an integrity monitoring standpoint, levels 2 and 3 are an extension of level 1, the difference being that at level 2 the driver inputs are not necessarily trusted and at level 3 driver inputs are indeed not trusted.

Level 3 is an extension of level 2. The integrity mechanisms at level 3 are triggered in the same way as on level 2. The difference being that at level 3 when compared to level 2, the vehicle is automatically operated to achieve a safe state by dynamically identifying the appropriate safe state, considering multiple system external factors, and controlling the actuators accordingly. Thus at level 3 control over integrity of the system acknowledges that the driver is part of the control system, as a passive component rather than an active one. As illustrated, if desired the system can be controlled to voluntarily enter level 3, through an external command signal sent via one of the sensors 102, such as via a switch operated by authenticated remote control. When voluntarily entering level 3, the vehicle can be controlled by an external information or guidance source. This capability has many uses. For example the vehicle can be controlled automatically as it enters a given stretch of roadway. Similarly, a trailer or connected chain of trailers can be automatically controlled from the cab when they are attached to a tractor in a semi-trailer truck application.

Assessing Driver Trustworthiness

There are specialized sensors, such as video cameras trained on the driver's eyes that may be used to derive information indicative of the untrustworthy driver condition. While such sensors may be used, the untrustworthy driver condition can also be calculated using trained statistical model analysis or neural network analysis of the sensor data received from the communication bus. A neural network embodiment has been illustrated in FIG. 6 where an exemplary neural network structure is shown at 150.

Figure 6:
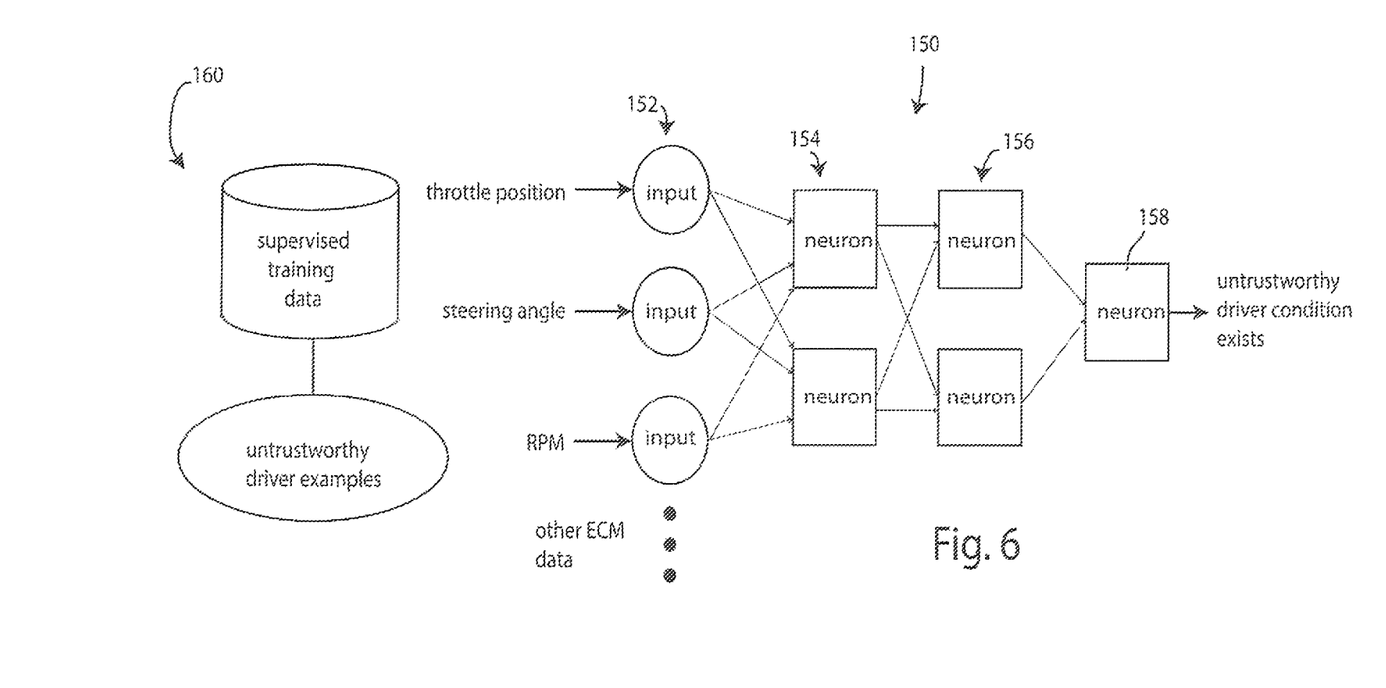
FIG. 6 is a neural network useful in determining the existence of the untrustworthy driver condition.

As illustrated, each of the relevant communication bus data signals is supplied to one of a plurality of input nodes 152. These input nodes are then coupled via synapses (represented as lines) to the intermediate neurons 154, with the outputs thereof being supplied via synapses to further neurons 156 and ultimately to neuron 158 which supplies the output signal indicating whether an untrustworthy driver condition exists. Each neuron includes a combining function, such as an adder function that combines the inputs received from the incoming synapses into a combined data value. Each neuron also includes a threshold activation function that tests or manipulates the combined data value to determine what the output of that neuron will be. The threshold activation function is preferably a non-linear function, such as a simple step function, or a sigmoid function (if analog behavior is desired). If a step function is used, the neuron will produce a logical 1 output if the combined data value exceeds a predetermined threshold. If a sigmoid function is used, the neuron will produce an analog output value that varies depending on the combined data value.

A key feature of the neural network is that each synapse is associated with a weighting value (a numerical weight) that is applied to the input value, such as by multiplied by the input value to that synapse with the associated weight. These weighting values are subject to change as the neural network is trained. By providing ample training data, the weighting values associated with the individual synapses are adjusted through successive training iterations until the neural network has been trained to recognize the condition for which it was trained when presented with unknown input data.

At the outset, before training, all of the weights associated with the individual synapses are set to initial values, such as random values. These weights are subsequently altered through a learning process known as "training." Preferably, training is performed in a supervised fashion where a data set 160 of supervised training data representing a class of untrustworthy driver examples are supplied, one at a time, to the neural network 150 while iteratively adjusting the weights of the individual synapses until an untrustworthy driver condition is output from the final neuron 158. The process is then repeated for each of the remaining examples of training data, further refining the weights of individual synapses to maximize the likelihood that the neural network will repeatedly identify each of the supervised training examples as an untrustworthy driver condition.

Having thus been trained, the neural network 150 is able to operate on known data supplied to inputs 152 from the communication bus during system use. Whenever the conditions represented by the input data values correspond to the learned untrustworthy driver condition, the output neuron 158 produces a positive output.

One benefit of using a trained model, such as neural network 150, is that different sets of training data may be supplied for different classes of untrustworthy drivers. Separate neural networks can be trained for each of these classes and then all would be used in parallel to assess not only that an untrustworthy driver condition exists, but the more specific nature of that condition. Thus, for example, one set of supervised training data may represent drowsy drivers, another supervised training data set might represent inebriated drivers, and so forth. In this way, a set of neural networks are trained to recognize each of the different untrustworthy driver conditions, all using the same raw input data received from the communication bus.

While the neural network example has been presented here, other types of artificial intelligence systems may also be used. Therefore, the neural network 150 may be replaced by a trained statistical modeling system or by a decision tree expert system, or the like.

Vehicle Motion (e.g. Propulsion) Master Example

Figure 7:
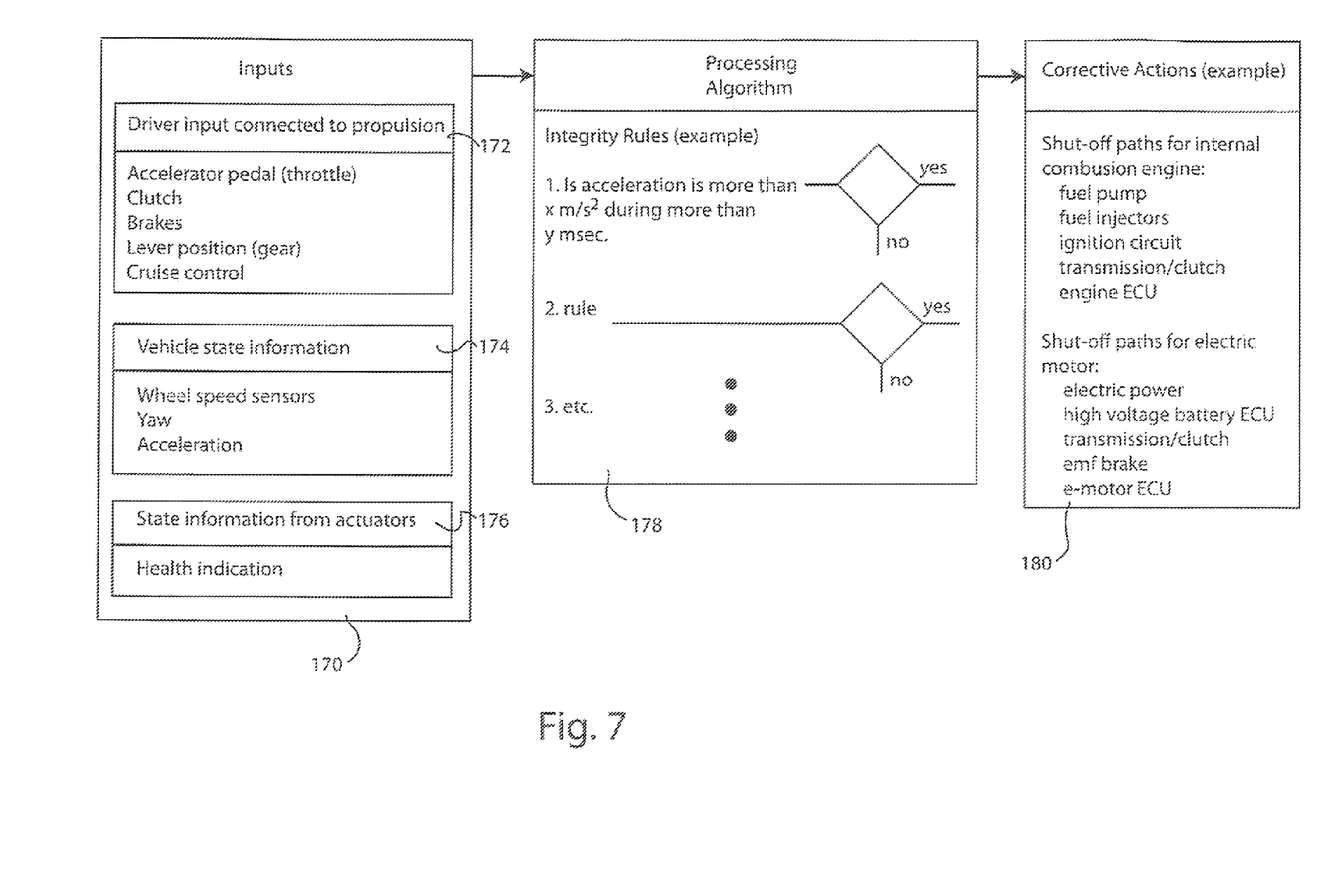
FIG. 7 is a block diagram depicting the multi-level control system in use in an exemplary embodiment.

FIG. 7 gives an example of the multi-level control system in use to assert control over the propulsion dimension in the hybrid vehicle featured in FIG. 1. While a variety of different input signals can be relied upon, the exemplary embodiment defines a set of inputs used by the control algorithm, shown at 170. The vehicle motion master 116 (FIG. 4) defines a subset 172 of this set of inputs as driver correlated input signals, that is, driver input connected to propulsion. A second subset 174 is defined as vehicle state information, while a third subset 176 is defined as state information from actuators.

These inputs are processed by the processing algorithm 178 of the propulsion master. The processing algorithm may be implemented as a set of integrity rules, each rule checking for the existence of a predefined condition. For example, as illustrated in FIG. 7, rule 1 tests whether acceleration of more than a predetermined acceleration 'x' exists for more than 'y' milliseconds. The processing algorithm repeatedly cycles through each of its set of integrity rules (as controlled by the program sequence control module 72 (FIG. 2). When a tested condition exists, a message is sent to the corrective actions algorithm 180.

The corrective actions algorithm 180 interprets the message sent from the processing algorithm, which can include embedded data values providing the captured values of various inputs 170, or pointers to where those values are stored. The corrective actions algorithm 180 determines what corrective action is appropriate, taking into account not only the triggering condition but also the level of driver trustworthiness. In other words, the corrective actions algorithm 180 is aware of the current safety-integrity level the propulsion master is operating in (level 0, level 1, level 2, level 3). The corrective actions algorithm interprets all of these conditions, determines the corrective action to be taken and notifies each of the local propulsion controls (118, 120 in FIG. 4) how to respond.

In some instances the corrective actions algorithm may determine that one or more propulsion systems should be shut off. The corrective actions algorithm thus includes a predefined set of shut-off paths for both the internal combustion engine and the electric motor, which it may select from to effect a system shut-off that is most appropriate under the current circumstances. It should be noted that the corrective actions algorithm controls more than one actuator and has more than one shut-off path for each actuator. The corrective action paths are designed to be as independent as possible. This gives the corrective actions algorithm great flexibility to respond in a variety of situations, including those where some of the actuators themselves may not be properly functioning.

From the foregoing it will be appreciated that the multi-level control system offers many benefits. The control architecture provides multiple shutoff paths on different levels of abstraction, affording greater overall control while ensuring system integrity. The level 1 vehicle safety and integrity mechanism has access to all actuators that affect the mastered vehicle motion. The level 2 and level 3 safety and integrity mechanisms handle situations that are not being handled in vehicles today, such as situations where the driver is impaired or incapacitated. The multi-level control system architecture makes possible the creation of new decompositions in the vehicle, which decreases the functional safety and integrity requirements on mechanisms that exist today (level 0). The level 1 safety and integrity mechanisms offer greater flexibility than with conventional practice. For example, a level 1 safety and integrity mechanism may allow an actuator to continue to operate under certain conditions where a level 0 safety and integrity mechanism, as conventionally implemented would require the actuator to be shut off.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-level control circuit for controlling multiple actuators associated with at least one motion direction within an automotive vehicle having plural sensors and actuators for effecting changes in vehicle motion in at least said one motion direction, where at least one of the sensors provides driver correlated input signals corresponding to actions performed by the driver, comprising:
   a master control circuit coupled to receive input signals from said sensors and coupled to provide electronic control signals to said actuators and to monitor the state of said actuators;
   the master control circuit being configured to provide multiple levels of control over vehicle motion in said one motion direction;
   the multiple levels including:
   (a) an actuator monitoring level in which the integrity of said actuators is assessed;
   (b) a first actuator controlling level that interprets input signals from said sensors, including driver correlated input signals and provides supervisory control over said actuators;
   (c) a second actuator controlling level that assesses a level of driver trustworthiness by interpreting said input signals and that provides supervisory control over said actuators in a manner different from that effected by the first actuator controlling level when driver trustworthiness is below a predetermined level.

2. The control circuit of claim 1 wherein said multiple levels further include:
   (d) a third actuator controlling level that provides supervisory control over said actuators in a manner different from that effected by the second actuator controlling level where at least one driver correlated input signal is ignored.

3. The control circuit of claim 1 wherein said multiple levels further include:
   (d) a third actuator controlling level that provides supervisory control over said actuators based on a guiding source other than the driver.

4. The control circuit of claim 1 wherein the vehicle motion is controlled in plural different directions and wherein the master control circuit is configured to provide said multiple levels of control for each of said plural different directions.

5. The control circuit of claim 1 wherein the vehicle motion is controlled in plural different directions and wherein the master control circuit comprises separate individual master control circuits for each of said plural different directions.

6. The control circuit of claim 5 wherein said individual master control circuits operate independently of one another.

7. The control circuit of claim 1 further comprising at least one sensor for assessing driver trustworthiness.

8. The control circuit of claim 1 further comprising trained statistical model to assess driver trustworthiness.

9. The control circuit of claim 8 wherein said trained statistical model includes a neural network.

10. The control circuit of claim 1 wherein said master control circuit includes at least one programmed processor or application specific integrated circuit.

11. The control circuit of claim 1 wherein said master control circuit includes at least one processor programmed according to a layered software architecture.

12. The control circuit of claim 11 wherein the vehicle has at least one engine and wherein the layered software architecture includes:
   (1) a lower layer that monitors the health of processes running on said at least one processor,
   (2) a middle layer that monitors the engine; and
   (3) an upper layer that monitors driving functions associated with controlling the vehicle.

13. The control circuit of claim 12 further comprising a monitoring module communicating with the lower layer to assess the health of processes running in said lower layer.

14. The control circuit of claim 12 wherein said at least one processor in implementing said lower layer submits questions to software running in said middle layer, and monitors the responses received to thereby assess the health of processes running in said middle layer.

15. The control circuit of claim 12 wherein said upper layer communicates with output stage circuitry that provides control signals to operate components within the vehicle.

16. The control circuit of claim 12 wherein at least one of said lower layer and middle layer provides an enable signal to selectively inhibit operation of components within the vehicle.

17. The control circuit of claim 12 wherein said middle layer performs torque monitoring.

18. The control circuit of claim 12 wherein said middle layer performs continuous torque monitoring whereby actual propulsion torque is compared with requested propulsion torque provided through processes running in the upper layer.

19. The control circuit of claim 12 wherein said upper layer further includes processes that monitory integrity of said plural sensors and actuators.

20. The control circuit of claim 1 wherein said master control circuit is coupled to said vehicle through an output stage circuit that can be selectively disabled to allow the multiple actuators to operate autonomously and without reliance on signals from the master control circuit.

21. A method of controlling multiple actuators associated with at least one motion direction within an automotive vehicle having plural sensors and actuators for effecting changes in vehicle motion in at least said one motion direction, where at least one of the sensors provides driver correlated input signals corresponding to actions performed by the driver, comprising:
   using at least one master control circuit that provides multiple levels of control over vehicle motion in said one motion direction by mediating the supply of electronic control signals to said actuators to:
   (a) monitor, in a first of said multiple levels of control, the integrity of said actuators;
   (b) interpret, in a second of said multiple levels of control, input signals from said sensors, including driver correlated input signals and providing supervisory control over said actuators; and (c) assessing, in a third of said multiple levels of control, driver trustworthiness by interpreting said input signals and providing supervisory control over said actuators in a manner different from that provided in step (b) when driver trustworthiness is below a predetermined level.

22. The method of claim 21 further comprising using said at least one master control circuit to:
(d) provide supervisory control over said actuators in a manner different from that provided in steps (b) and (c) where at least one driver correlated input signal is ignored.

23. The method of claim 21 further comprising using said at least one master control circuit to:
(d) provide supervisory control over said actuators based on a guiding source other than the driver.

24. The method of claim 21 wherein vehicle motion is controlled in plural different directions and wherein steps (a), (b) and (c) are separately performed for each of said plural different directions.

25. The method of claim 21 wherein driver trustworthiness is determined using at least one sensor.

26. The method of claim 21 wherein driver trustworthiness is determined using a trained statistical model.

27. The method of claim 26 wherein the statistical model includes a neural network.

28. The method of claim 21 further comprising using said at least one master control circuit to:
(d) provide supervisory control over said actuators based on an information source external to the vehicle.

* * * * *